United States Patent [19]
Ebisawa et al.

[11] Patent Number: 5,139,676
[45] Date of Patent: Aug. 18, 1992

[54] BACTERIOSTATIC WATER AND METHOD FOR PRODUCING THE SAME

[75] Inventors: Kenichiro Ebisawa; Atsushi Niwada; Kenzo Kaneko, all of Tokyo, Japan

[73] Assignee: Nippon Sanso Kabushiki Kaisha, Tokyo, Japan

[21] Appl. No.: 560,044

[22] Filed: Jul. 30, 1990

[51] Int. Cl.$^5$ .............................................. C02F 1/44
[52] U.S. Cl. ................................. 210/651; 210/181; 210/259
[58] Field of Search ............... 210/205, 321.69, 636, 210/181, 257.2, 259, 651, 652; 435/34, 32

[56] References Cited

U.S. PATENT DOCUMENTS

| | | | |
|---|---|---|---|
| 3,843,521 | 10/1974 | Zeff | 210/205 X |
| 4,767,528 | 8/1988 | Sasaki et al. | 210/205 X |
| 4,773,993 | 9/1988 | Yoda et al. | 210/321.69 X |

FOREIGN PATENT DOCUMENTS

| | | |
|---|---|---|
| 0183968 | 6/1986 | European Pat. Off. |
| 0254519 | 1/1988 | European Pat. Off. |
| 2-203982 | 8/1990 | Japan |

*Primary Examiner*—Frank Spear
*Attorney, Agent, or Firm*—Scully, Scott, Murphy & Presser

[57] ABSTRACT

The invention relates to bacteriostatic water and to a method of producing bacteriostatic water, and is characterized by the steps: a) heating unprocessed water to produce primary water; b) filtering the primary water in order to remove bacteria and dust to produce secondary water; and c) exposing the secondary water to oxygen gas to produce bacteriostatic water. In this invention, oxygen gas is used not only as a biostatic treating agent, but also as an aerosol propellant. The container is filled with the product water, on the product water is bacteriostatically stable for an extended period.

13 Claims, 1 Drawing Sheet

BACTERIOSTATIC WATER AND METHOD FOR PRODUCING THE SAME

BACKGROUND OF THE INVENTION

1. FIELD OF THE INVENTION

This invention relates to bacteriostatic water, and a method of producing the same, that may be utilized to prevent bacteria from propagating in a number types of preserved water. The present invention may be used, for example, for cosmetics sealed in spray cans, or for drinking water in closed containers; however it will be appreciated that the bacteriostatic water is also useful in many other applications.

2. BACKGROUND ART

Cosmetics containing naturally-occurring mineral water or artificially purified water have been available commercially in sealed containers. In sealed containers such as spray cans, nitrogen is frequently used as the propellant, and the contents must be as pure as possible. For the purpose of purifying unprocessed water, it is generally necessary to treat the water with an antiseptic or germicide. However, this results in the antiseptic or germicide remaining in the water. On the other hand, the quality of the contents must be stable for an extended period, and in particular, bacterial contamination or degradation by bacterial proliferation must be avoided.

Because of this, water for conventional cosmetics and the respective containers are treated by one or more of the following methods, in order to prevent bacterial contamination (a) Sterilizing unprocessed water with heat, ultraviolet rays, a germicide or by filtration (b) Filling the container with bacteriostatic water treated with heat, ultraviolet rays, or other adequate agent.

(c) Filling the container using a sterile procedure sterile environment to prevent secondary contamination.

(d) Sterilizing the product (the contents and the propellant sealed in the container) with heat a second time.

Reliable corrective steps against bacterial contamination and propagation have not yet been established, and the above methods, exhibit one or more of the following problems (1) Chemical treatment may cause contamination of contents.

(2) Maintaining a sterile environment requires extensive facilities and is expensive. It is also very difficult to produce a completely germfree atmosphere.

(3) Sterilizing the container and its content may result (in the case of a container made partly of rubber, plastic or other macromolecular material, such as that in an atomizer), in the release of foul odors, or in discoloration and degradation, because organic compounds are released into the contents.

The object of the present invention is to provide bacteriostatic water and a treatment process, free of the above problems, and to provide bacteriostatic water stable for an extended period of time. The bacteriostatic water described in this specification, refers to water in which bacterial propagation is inhibited and the water is of a stable quality for an extended period of time.

Unprocessed water described in this specification refers to water containing bacteria, various types of dust particles, etc., which occur naturally in tap water.

SUMMARY OF THE INVENTION

The method in this invention for producing bacteriostatic water from unprocessed water containing bacteria is to heat the water to sterilize it and to kill the contaminating bacteria. The water is then treated with oxygen, while it is being filled in the container, in such a way that the oxygen is dissolved in the water at least 20 ppm. This simple procedure achieves the goal of producing bacteriostatically treated water of a quality stable for an extended period of time.

This inexpensive method requires no special facilities.

The bacteriostatically treated water produced by the above method is stable in quality due to the sterile and bacteriostatic effects of oxygen dissolved in the water. Moreover, the water produced by the above method is safe for drinking or for use in cosmetics because the treatment process uses only oxygen and thus does not employ any chemical agents having toxic effects.

Bacterial propagation is effectively inhibited by the oxygen gas, even when secondary contamination occurs during the processing.

DETAILED DESCRIPTION OF THE PREFERRED EMBODIMENTS

Figure 1:
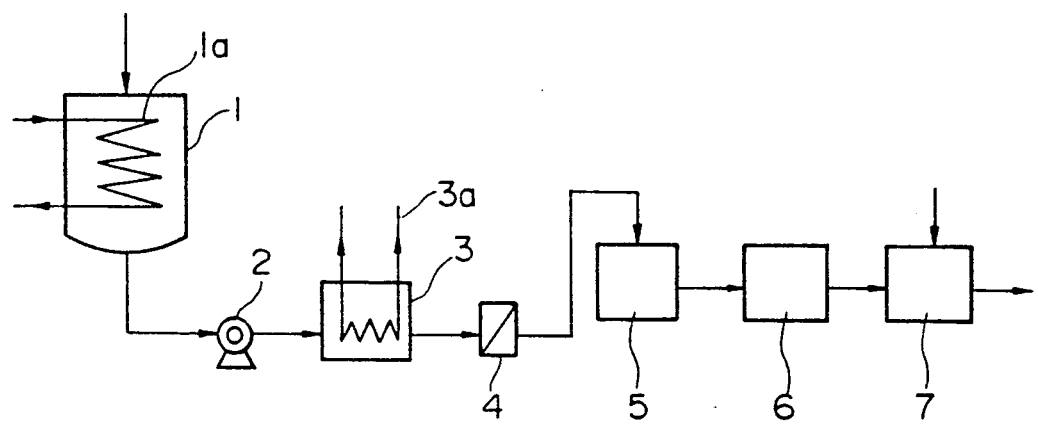
FIG. 1 is a simplified flow diagram of the treatment process for the bacteriostatic water.

The bacteriostatic water of the present invention is produced by the following steps:

(a) Heating step: Unprocessed water is heated to produce primary water. The heating treatment must heat the water to 85° degrees C or more for at least 30 minutes to prevent bacteria in the water from continuing to live (if necessary, the primary water may then be cooled to less than 50 degrees C).

(b) Filtering step: In this step, heat-killed bacteria, along with some kinds of dust from the primary water, are removed, in order to produce secondary water.

(c) Filling step: In this step, the secondary water is filled into a closed container.

(d) Exposing step: In this step, the secondary water is exposed to oxygen gas, or a gas mixture containing oxygen gas and inert gases (for example nitrogen or helium gas). In this step, it is necessary to keep the pressure in the container at preferred conditions so that the concentration of oxygen gas dissolved in the secondary water is higher than 20 ppm.

The attached drawing illustrates one embodiment of the invention. FIG. 1 shows the flow diagram of a method to produce bacteriostatic water for use as a cosmetic water filled in a spray can.

In the drawing, numeral 1 indicates the heating tank serving as the unprocessed water tank, and numeral 1a indicates a conduit for steam to heat the tank 1. The unprocessed water, which may be naturally-occurring mineral water or artificially purified water, is heat sterilized at 85 degrees C. or more for at least 30 minutes in the heating tank 1; the primary water is thereby produced.

The primary water, after being thermally sterilized, passes through the provided pump 2, and if necessary, the cooling tank 3, to the serialization filter unit 4. The pump 2 provides the high pressure needed in the processes downstream, and the pump 2 increases the pressure of the primary water to an adequate level. The cooling tank 3 cools the heated the primary water to less than 50 degrees C. The conduit 3a to cool the primary water in the cooling tank 3, is where the cooling water circulates. The cooling tank 3 prevents diffusion of toxic organic compounds from the sealed container into the contents, which may otherwise happen when the sealed container is filled with the hot primary water. In other words, if a sealed container is partially or entirely composed of rubber, plastic or another macromolecular material, such as in a spray can, organic compounds from the container diffuse into the contents if the container is filled with the hot water at temperatures above 50 degrees C. The object of the cooling tank 3 is to prevent the above problem. The cooling tank 3, therefore, is not needed unless there is the possibility of degradation and diffusion of organic compounds.

The sterilization filter unit 4, for example, has 0.1 to 0.2 micron pore filters which can remove fairly fine solids, such as bacteria and organic matter, to produce a secondary water. The liquid filler 5 fills the container with the secondary water flowing out of the sterilization filter unit 4. A valve is attached to the container by the valve crimper 6. The container has a valve controlled by the valve crimper 6, and is then filled with oxygen (or a mixture of oxygen and an inert gas under pressure) by the gas filler 7. This completes the production of the bacteriostatic water. The inert gases are most preferably selected from the group including nitrogen, argon and carbon dioxide. Carbon dioxide is particularly preferred, because it is like oxygen in that it has sterilizing and bacteriostatic effects. In the sealed container, water must come into contact with oxygen (or the oxygen-containing mixture) under a partial pressure of at least 0.5 atm at room temperature. In other words, the oxygen or the oxygen-containing mixture must be filled in under pressure in order to ensure that the concentration of oxygen gas dissolves in the water at 20 ppm or more. For spray water for cosmetics, the oxygen or oxygen-containing mixture also acts as the propellant. Ideally, the vapor phase, which also serves as the propellant, should be totally utilized before the product container is discarded. In other words, the vapor phase should be maintained at as high a pressure as of possible while observing the safety standard limit of 8 kg/cm$^2$G(gauge) at 35 degrees C., so that enough pressure is available for the final stages of use.

Referring to the process diagrammed in the attached drawing, one advantage of heat sterilizing all of the piping systems is that the heating tank 1 can be maintained around 95 degrees C. and the hot primary water can pass through all the equipment, including the piping systems and fittings, up to the liquid filler 6, before the production actually begins.

EXAMPLES

Example 1

In one case, natural mineral water was used as the unprocessed water, and it was treated by the process shown in the attached figure 1, to produce bacteriostatis water. The heating tank was filled with the unprocessed water, and was heated to 100 degrees C. by circulating steam through the steam conduit. The hot water then passed through the cooling tank, sterilization filter unit, liquid filler and valve crimper, by means of the pump. The water was then heat sterilized and the equipment and associated piping systems were flushed. The water was then discharged from the liquid filler.

Next, the heating tank was again filled with the heat-sterilized water(at 85 degrees C. for at least 30 minutes), and steam was supplied to the conduit to heat the water to become bacteriostatic.

The water was then passed through to the cooling tank, by the pump, where it was cooled to 50 degrees C or below.

Then it was sterilized in the filter unit, having a pore size of 0. to 0.2 micron to remove bacteria.

160 g of the secondary water, together with oxygen gas, was filled into a sealed aerosol container. The aerosol container was made of aluminum and was lined with a resin coating on the inside. The maximum pressure in the aerosol container was 8 kg/cm$^2$G(gauge) at 356 degrees C., and the sealed container was confirmed to be safe.

The oxygen in the aerosol container has a partial pressure of 0.5 atm at 25 degrees C., which ensures that the oxygen was dissolved in the bacteriostatic water at 20 ppm.

EXAMPLE 2

The bacteriostatic water filled in the aerosol container in the above step was stored at 35 degrees C. for 2 weeks. After b 2 weeks at 35 degrees C., the bacteriostatic water was then tested for the number of bacteria.

The testing was performed as specified by the japanese Pharmacopoeia, to count the number of bacteria of general types and colon bacilli. It was found that bacteria of general types were present at below 30/ml, that is, below the measurable limit, and the product water tested negative for colon bacilli.

EXAMPLE 3

The same detection procedure was used for bacteriostatic treated water stored at various room temperatures, ranging from 5 degrees C. to 35 degrees C. for a year, and the same results as above were obtained: 30/ml or less with respect to the genera bacteria and negative with respect to colon bacilli.

EXAMPLE 4

The following test was conduct to investigate the sterilizing and bacteriostatic effects of dissolved oxygen.

Untreated mineral water containing $2.9 \times 10^5$/ml of bacteria of general types was injected into aerosol containers together with each of the gases listed in Table 1. After 2 weeks at 35 degrees C., the sealed mineral water was tested for general bacteria content. The results are given in Table 1.

It was confirmed that the content of bacteria of general types in mineral water decreased when the water was sealed in a container so that the oxygen dissolved therein was kept at 20 ppm or more, after having been stored at 35 degrees C. for 2 weeks. This clearly demonstrates the sterilizing and bacteriostatic effects of dissolved oxygen.

TABLE 1

| Sample No. | Gas Type | Gas Pressure (atm) | Oxygen Partial Pressure (atm) | Content of Dissolved Oxygen (ppm) | Number of Bacteria of General Types* (/ml) |
| --- | --- | --- | --- | --- | --- |
| 1 | $N_2$ | 1 | 0.05 or less | 10 or less | $7.7 \times 10^4$ |
| 2 | $N_2$ | 4 | 0.05 or less | 10 or less | $6.3 \times 10^4$ |
| 3 | $N_2$ | 8.5 | 0.05 or less | 10 or less | $2.2 \times 10^5$ |
| 4 | Air | 1 | 0.2 | 10 or less | $4.4 \times 10^4$ |
| 5 | Air | 5 | 1 | 40 | 30 or less* |
| 6 | $O_2$ | 0.5 | 0.5 | 20 | 30 or less* |
| 7 | $O_2$ | 1 | 1 | 40 | 30 or less* |
| 8 | $O_2$ | 4 | 4 | 160 | 30 or less* |
| 9 | $O_2$ | 8.5 | 8.5 | 340 | 30 or less* |
| 10 | Air | open to air | 0.2 | 10 or less | $2.9 \times 10^5$ |

[Note]
*indicates counts too small to be measured.

What is claimed is:

1. A method of producing bacteriostatic water comprising the steps of:
   (a) heating unprocessed water containing bacteria to produce primary water;
   (b) filtering the primary water with a membrane filter to produce secondary water;
   (c) filling the secondary water in a closed container; and
   (d) exposing said secondary water filled in the close container to one of oxygen gas, and a gas mixture of oxygen gas and inert gases, the concentration of the oxygen gas in the secondary water not less than 20 ppm.

2. A method of producing bacteriostatic water as recited in claim 1, wherein the unprocessed water is heated at 85 degrees C. for 30 minutes or longer.

3. A method of producing bacteriostatic water as recited in claim 2, wherein the primary water is cooled to 50 degrees C. or less before the primary water is filtered.

4. Bacteriostatic water produced by the method recited in claim 3.

5. A method of producing bacteriostatic water as recited in claim 2, wherein the closed container is one for an aerosol.

6. Bacteriostatic water produced by the method recited in claim 2.

7. Bacteriostatic water produced by the method recited in claim 1.

8. Bacteriostatic water comprising:
   (a) untreated, bacteria-containing, natural mineral water placed in a closed container; and
   (b) oxygen gas dissolved in the natural mineral water to provide an oxygen concentration effective to prevent the bacteria from propagating, said oxygen gas being present in said container at a minimum partial pressure of 0.5 atmospheres at 25° C.

9. Bacteriostatic water as recited in claim 8, wherein the concentration of oxygen gas is not less than 20 ppm.

10. Bacteriostatic water as recited in claim 9, wherein the closed container is one for an aerosol.

11. Bacteriostatic water as recited in claim 10, wherein oxygen gas is used as a propellant for the aerosol container.

12. Bacteriostatic water comprising:
   (a) a natural mineral water placed in a closed container, said natural mineral water having been obtained by heating and filtering untreated, bacteria-containing, natural mineral water prior to being placed in the closed container; and
   (b) oxygen gas dissolved in the natural mineral water to provide an oxygen concentration effective to prevent the bacteria from propagating, said oxygen gas being present in said container at a minimum partial pressure of 0.5 atmospheres at 25° C.

13. Bacteriostatic water as recited in claim 12, wherein the concentration of oxygen gas is not less than 20 ppm,.

* * * * *

UNITED STATES PATENT AND TRADEMARK OFFICE
CERTIFICATE OF CORRECTION

PATENT NO. : 5,139,676
DATED : August 18, 1992
INVENTOR(S) : Kenichiro Ebisawa, et al.

It is certified that error appears in the above-identified patent and that said Letters Patent is hereby corrected as shown below:

Column 1, line 39: after "procedure" insert --in a--

Column 4, line 14: "0." should read as --0.1--

Column 4, line 20: "356" should read as --35--

Column 4, line 23: "has" should read as --had--

Column 4, line 32: delete "b"

Column 4, lines 34-35: "japanese" should read as --Japanese--

Column 4, line 47: "genera" should read as --general--

Column 4, line 52: "conduct" should read as --conducted--

Column 4, line 63: "oxygen dissolved" should read as --oxygen partial pressure was kept at 0.5 atm or more at 25 degrees C. The same is true when the quantity of oxygen dissolved--

UNITED STATES PATENT AND TRADEMARK OFFICE
CERTIFICATE OF CORRECTION

PATENT NO. : 5,139,676

DATED : August 18, 1992

INVENTOR(S) : Kenichiro Ebisawa, et al.

It is certified that error appears in the above-identified patent and that said Letters Patent is hereby corrected as shown below:

Column 6, line 34, Claim 1: delete "a"

Column 6, line 46, Claim 13: "ppm,." should read as --ppm.--

Signed and Sealed this

Twenty-eighth Day of September, 1993

Attest:

BRUCE LEHMAN

Attesting Officer

Commissioner of Patents and Trademarks